United States Patent [19]

Reed et al.

[11] 4,054,697
[45] Oct. 18, 1977

[54] DECORATIVE SHEET MATERIAL

[75] Inventors: David Robert Reed, Mottram; Thomas Whitehead Stafford, Hyde, both of England

[73] Assignee: Imperial Chemical Industries Limited, London, England

[21] Appl. No.: 626,562

[22] Filed: Oct. 28, 1975

[30] Foreign Application Priority Data

Dec. 16, 1974 United Kingdom ............... 54172/74

[51] Int. Cl.$^2$ ............................................. E04F 13/00
[52] U.S. Cl. ..................................... 428/40; 428/202; 428/211; 428/327; 428/342; 428/354
[58] Field of Search ............... 428/40, 41, 306, 323, 428/326, 343, 327, 357, 195, 201, 202, 206, 211, 219, 341, 342, 354, 906; 427/202, 212, 214, 201, 207 B, 207 C, 207 D

[56] References Cited

U.S. PATENT DOCUMENTS

| 3,016,308 | 1/1962 | Macaulay | 260/2.5 B |
|---|---|---|---|
| 3,027,271 | 3/1962 | Plasse et al. | 428/306 |
| 3,030,223 | 4/1962 | Alstad et al. | 428/327 |
| 3,309,257 | 3/1967 | Borack | 428/40 |
| 3,502,539 | 3/1970 | MacPhail, Sr. | 428/147 |
| 3,531,316 | 9/1970 | Sternasty | 428/352 |
| 3,620,366 | 11/1971 | Parkinson et al. | 428/352 |

FOREIGN PATENT DOCUMENTS

| 1,594,060 | 7/1970 | Germany | |
|---|---|---|---|
| 1,212,240 | 3/1966 | Germany | 427/202 |
| 1,061,891 | 3/1967 | United Kingdom | |

Primary Examiner—William J. Van Balen
Attorney, Agent, or Firm—Cushman, Darby & Cushman

[57] ABSTRACT

A sheet material having a decorative surface and a working surface, for application to a support surface is disclosed, the working surface of which is provided with a continuous coating of tacky, pressure-sensitive, adhesive, which adhesive is provided with a coating of a discontinuous layer of resilient, non-adhesive particles. The coating of particles have the ability to be deformed under a load and thus, upon application to a support surface, deform, under pressure, to such an extent as to bring the adhesive and the surface into fuller contact.

5 Claims, No Drawings

DECORATIVE SHEET MATERIAL

This invention relates to a decorative sheet material for applying to a wall, ceiling, floor, kitchen unit, table or other surface within domestic or industrial premises or place of amenity.

A decorative sheet material such as a wallcovering is usually adhered to the appropriate surface through the medium of an aqueous paste of a cellulosic material such as sodium carboxy methyl cellulose. Generally, this paste has first to be made from the dry powder and is then brushed on to the back of the decorative sheet material which is then placed in position on the surface. This process is both time consuming and also requires considerable dexterity to prevent damage to the wet sheet material, particularly if it is of paper, whilst being applied to the surface. One modification of this method is to apply the adhesive on to the sheet material at the manufacturing stage so that it can be reactivated by wetting with water, but this does not obviate the need for wetting out and handling, often large, sheets of the sheet material.

It has been suggested that the difficulty can be avoided by using a pressure-sensitive adhesive which does not require to be wetted out. However, the pressure-sensitive adhesive, being applied at the manufacturing stage, requires to be covered by a release paper if the decorative sheet material is to be rolled up. This increases the cost of the product. Furthermore, because of the tacky nature of pressure-sensitive adhesives, it is difficult, if not impossible, to slide the sheet material about on the surface in order that a precise positioning of the sheet material might be achieve. This is particularly necessary when the sheet material is a wallcovering.

According to the present invention we provide a sheet material having a decorative surface and a working surface, the working surface being provided with a continuous coating of a tacky, pressure-sensitive, adhesive on which is provided a discontinuous layer of resilient, nonadhesive, particles.

The term "resilient" implies that the particles have the ability to be deformed under a load and then, or at a later time, have the ability to recover to substantially their original dimensions. The resilient particles protrude from the surface of the adhesive coating so that if the working surface of the sheet material is superimposed on a support surface, such as a wall, the adhesive does not come into complete contact with the support surface even with the application of light hand pressure. Also the sheet material may be moved around over the support surface, again with light hand pressure and moved into position as desired. However, when in the desired position, the sheet material can be adhered to the surface merely by applying sufficient pressure by means of a hand or a roller to deform the particles on the surface of the adhesive to such an extent as to bring the adhesive and the surface into fuller contact.

Conveniently, the resilient particles are of a natural or synthetic rubber or blends thereof or a foamed organic polymeric material such as polyurethane, polyvinyl chloride, polyethylene, polypropylene or polystyrene.

The resilient particles may either be partially embedded in, or merely lie on the surface of the adhesive coating.

The resilient particles may be sprinkled or otherwise applied on to the adhesive coating to form a discontinuous layer of particles on the adhesive coating. Alternatively, the resilient particles may be formed in-situ on the adhesive coating by depositing, for example by printing or spraying, a discontinuous layer of an organic foam-forming composition on the coating and causing, usually by the application of heat, the composition to expand and foam, so forming a layer of spaced resilient foamed particles on the coating.

The proportion of the surface area of the adhesive coating which requires to be covered by the discontinuous layer of resilient particles is dependent on many factors such as the size and distribution of the particles, the resilience of the particles, the strength of the adhesive, the thickness of the adhesive coating, the deformability and surface irregularity of both the sheet material and the support surface.

In general with a substantially uniform distribution of particles, useful products can be produced when between 2% and 50% of the surface area of the adhesive coating is covered by the non-adhesive resilient particles. In preference, however, between 5% and 20% of the available adhesive surface is covered by the non-adhesive resilient particles.

The pressure-sensitive adhesive may be of any suitable material which, after the sheet material has been adhered to the support surface, will prevent the deformed particles from recovering to their undeformed dimensions which otherwise, in the extreme, would cause the sheet material to come away from the support surface.

In practice it may be desirable for the pressure-sensitive adhesive to be curable after the sheet material has been adhered to the support surface in order to overcome any tendency of the deformed particles to recover. A suitable adhesive can be selected from those which are commercially available based on alkyd resins, natural and synthetic rubbers (usually compounded with a tackifying resin and other additives) polybisobutylene, polyvinyl alkyl ethers, vinyl acetate copolymers, and acrylic ester polymers and copolymers thereof. Such adhesives may be applied on the working surface of the sheet material by any of the coating methods commonly used, as a solution, as an emulsion or as a hot melt.

In practice, it may be necessary to cover the discontinuous layer of resilient particles with a suitable release paper which, when the sheet material is rolled up for storage purposes, prevents adhesion to the decorative surface of the sheet material. Immediately prior to the sheet material being applied to the support surface the release paper can be removed, exposing the adhesive layer and allowing the deformed resilient particles to recover.

Alternatively, in order to prevent adhesion between the decorative surface and the working surface when the sheet material is rolled up, the decorative surface may be provided with a coating of a suitable material which prevents adhesion taking place.

The sheet material may be any of the usual decorative materials at present on the market, including paper (which may be mechanical, chemical or synthetic), plastic films and foils, for example, polyvinyl chloride, polyethylene, polypropylene, synthetic fibers mats and combinations of two or more of these. Such materials are usually decorated by printing and or embossing but, more recently, decorative effects have been achieved merely by laminating a woven or non-woven fabric or a metallic foil to the sheet material.

The invention will now be described with reference to the following examples

EXAMPLE 1

A printed and embossed sheet of a polyvinyl chloride coated paper (as sold by Imperial Chemical Industries under the Registered Trade Mark "Vymura") was provided on its non-decorative, i.e. paper, surface with a coating of a pressure-sensitive tacky adhesive based on ethyl hexyl acrylate. The adhesive coating has a weight of 25 grams per square meter and a thickness of 0.025 mm.

Graded chips of foamed polyurethane having an average particle size of approximately 350 microns were scattered over the adhesive surface until about 15% of the surface was covered.

When the adhesive coated sheet was placed, adhesive coating down on a variety of surfaces including sized and unsized plaster, emulsion and gloss painted surfaces, wood and the surface of a decorative rigid laminate, the sheet could be moved about on the surfaces. When in a desired position, the application of firm hand pressure on the decorative surface of the sheet caused the sheet to adhere with a firm bond to the surfaces.

EXAMPLE 2

Example 1 was repeated in its entirety except that the sheet material was a printed and embossed sheet of foamed polyethylene (as sold by Imperial Chemical Industries Limited under the registered Trade Mark "Novamura").

The adhesive coated sheet exhibited similar properties to those described in Example 1.

EXAMPLE 3

A sheet material as described in Example 2 was coated with a similar adhesive and then small particles (average size 50 microns) of a soft rubber were distributed thereon.

The sheet material could be positioned on and bonded to a surface in a similar manner to the sheet materials described in the earlier examples.

EXAMPLE 4

A sheet material as described in Example 2 was coated with adhesive as in Example 1 and was then sprayed with a typical multi-component polyurethane foaming composition so as to give a random distribution of droplets. The coated sheet was then heated to approximately 120° C for 30 seconds to cause the droplets to foam giving a random distribution of small foamed particles.

This material could also be positioned and bonded as previously described in the earlier Examples.

We claim

1. A sheet material having a decorative surface and a working surface, the working surface being provided with a continuous coating of a tacky, pressure-sensitive, adhesive, the improvement comprising providing on the adhesive coating a discontinuous layer of resilient, non-adhesive, solid particles of a material selected from a foamed organic polymeric material, a natural or synthetic rubber or blends thereof.

2. A sheet material as claimed in claim 1 in which between 5% and 20% of the available adhesive surface is covered by the non-adhesive resilient particles.

3. A sheet material as claimed in claim 1 in which the discontinuous layer of resilient particles is covered with a release paper.

4. A sheet material as claimed in claim 1 in which the decorative surface of the sheet material is provided with a coating of a material which prevents the decorative surface adhering to the adhesive coated working surface when the sheet is rolled up.

5. In a sheet material which is applied to a support surface, said sheet material having a decorative surface and a working surface, in which the working surface is provided with a continuous coating of a tacky, pressure-sensitive adhesive, the improvement in which said adhesive coating is provided with a discontinuous layer of resilient, non-adhesive solid particles of a material selected from a foamed organic polymeric material, a natural or synthetic rubber or blends thereof, said particles having the ability to deform under a load and the ability to recover to substantially their original dimensions, after being deformed, and upon application to said supporting surface deform to such an extent as to bring the adhesive coating and the support surface into contact.

* * * * *